US007831412B1

(12) United States Patent
Sobel et al.

(10) Patent No.: US 7,831,412 B1
(45) Date of Patent: Nov. 9, 2010

(54) SYSTEMS AND METHODS FOR PROVIDING GUIDANCE BY CATEGORY ON THE POTENTIAL IMPACT OF AN APPLICATION ON THE HEALTH OF A COMPUTING SYSTEM

(75) Inventors: William E. Sobel, Jamul, CA (US); Sourabh Satish, Freemont, CA (US)

(73) Assignee: Symantec Corporation, Mountain View, CA (US)

( * ) Notice: Subject to any disclaimer, the term of this patent is extended or adjusted under 35 U.S.C. 154(b) by 263 days.

(21) Appl. No.: 12/059,769

(22) Filed: Mar. 31, 2008

(51) Int. Cl.
*G06F 13/00* (2006.01)
*G06F 11/00* (2006.01)

(52) U.S. Cl. .................. 702/186; 702/179; 702/187; 702/188

(58) Field of Classification Search .......... 702/121–123, 702/179–181, 186–190
See application file for complete search history.

(56) References Cited

U.S. PATENT DOCUMENTS

2004/0205167 A1* 10/2004 Grumann .................... 709/220
2005/0233295 A1* 10/2005 Chiszar et al. .............. 434/350
2008/0141240 A1* 6/2008 Uthe ......................... 717/174

* cited by examiner

*Primary Examiner*—Hal D Wachsman
*Assistant Examiner*—Phuong Huynh
(74) *Attorney, Agent, or Firm*—Advantedge Law Group

(57) ABSTRACT

Embodiments of the instant disclosure may provide users with access to information that details, by application category, the potential impact an application may have on the health of a user's computing device. A method for determining the impact of a new application on the health of a computing system by category is also disclosed. Corresponding systems and computer-readable media are also disclosed.

19 Claims, 9 Drawing Sheets

First System-Health Evaluation
400

First Stability Index 402

| | |
|---|---|
| Running Average of Blue-Screen Errors | 0 |
| Running Average of Service Errors | 1 |
| Running Average of Application Errors | 1 |

404 } 406

First Performance Index 412

| | |
|---|---|
| Running Average of CPU Usage | 2.1875 |
| Maximum CPU Usage | 7 |
| Running Average of Page Faults | 248.4375 |
| Maximum Number of Page Faults | 844 |
| Running Average of IP Datagrams | 3.2500 |
| Maximum Number of IP Datagrams | 8 |

414 } 416

Second System-Health Evaluation
420

Second Stability Index 422

| | |
|---|---|
| Running Average of Blue-Screen Errors | 0 |
| Running Average of Service Errors | 2 |
| Running Average of Application Errors | 3 |

424 } 426

Second Performance Index 432

| | |
|---|---|
| Running Average of CPU Usage | 10.1999 |
| Maximum CPU Usage | 58 |
| Running Average of Page Faults | 960.8500 |
| Maximum Number of Page Faults | 3423 |
| Running Average of IP Datagrams | 3.2500 |
| Maximum Number of IP Datagrams | 9 |

434 } 436

System-Health-Impact Scores
440

Stability Impact 442

| | |
|---|---|
| Blue-Screen Errors Impact | 0% |
| Service Errors Impact | -50% |
| Application Errors Impact | -50% |

Performance Impact 446

| | |
|---|---|
| Average CPU Usage Impact | -78.5539% |
| Maximum CPU Usage Impact | -87.9130% |
| Average Page Faults Impact | -74.1440% |
| Maximum Page Faults Impact | -75.3433% |
| Average IP Datagrams Impact | 0% |
| Maximum IP Datagrams Impact | -11.1111% |

448

| | |
|---|---|
| Average Stability Impact | -33.3333% |
| Average Performance Impact | -55.5109% |
| Average System-Health Impact | -44.4421% |

FIG. 4

SYSTEMS AND METHODS FOR PROVIDING GUIDANCE BY CATEGORY ON THE POTENTIAL IMPACT OF AN APPLICATION ON THE HEALTH OF A COMPUTING SYSTEM

BACKGROUND

Literally thousands of computer programs and applications are available for installation on modern-day computing devices, such as the personal computer. Unfortunately, a user of a computing device is typically unable to determine whether an application will impact the health (e.g., the performance or stability) of the computing device before installing the application on the computing device. Because vendor-supplied information detailing the potential impact of an application on the health of a computing device may not be reliable, users may turn to elaborate reviews of applications published on the web by professional reviewers or other users. Such reviews, however, suffer from a number of deficiencies.

For example, a review of an application may not detail the impact the application had on the health of the reviewer's computing device. In addition, even if a reviewer wishes to highlight the perceived impact of an application on the health of the reviewer's computing device, the reviewer may have difficulty determining the precise impact the application had on the computing device's health due to the high number of applications typically installed on computing devices. Moreover, reviewers of an application may not be motivated to post a review of an application unless the reviewer experiences (or at least perceives) problems with the application. As such, reviews of an application may wrongly focus on perceived problems or weaknesses of an application.

In the absence of reliable information, users may not become aware of the negative impact of an application until after the application has been installed. Unfortunately, in some instances the negative effects an application may have on a computing device may not be reversed simply by uninstalling the application.

SUMMARY

As will be described in greater detail below, embodiments of the instant disclosure may provide users with access to information that details, by application category, the potential impact an application may have on the health of a user's computing device (hereafter, "system-health-impact information"). Additional embodiments for determining the impact of a new application on the health of a computing system by category are also disclosed.

For example, the impact a new application has on the health of a computing system may be determined by detecting the application as it is downloaded to or loaded onto a computing system, categorizing the application, performing a baseline evaluation of the system's health before the application is installed, allowing the application to be installed on the system, performing a second evaluation of the system's health after the application is installed, and then determining the impact of the application on the health of the system by comparing the results of the second evaluation with the results of the first evaluation.

Applications may be categorized automatically by assigning at least one application category, such as Multimedia or Word Processing, to the application or by prompting a user to assign at least one category to the application. In addition, the health of a system may be evaluated by evaluating the performance or stability of the system using various performance or stability metrics. Such metrics may measure the processor, memory, and network usage of the system, the number of operating-system, application, service, or device-driver errors experienced by the system, system uptime, or system reboots (such as the number of system reboots per day). As will be discussed in greater detail below, the impact an application has on the health of a system may be expressed by a system-health-impact score.

The results of each evaluation of a system's health may be compared either locally by the system itself or remotely by a backend or server. For example, a module on a local system may, after evaluating the health of the local system both before and after an application is installed, transmit the results of the evaluations to a backend, which may then remotely determine whether the application impacted the health of the local system by comparing the results of the evaluations. In certain embodiments, a unique identifier for an application, such as a name of the application or a checksum calculated for the application's installer, may also be transmitted along with the results of the evaluations to the backend.

In one embodiment, the new application may be detected and the first evaluation performed before the new application is fully installed on the system. Similarly, the second evaluation of the system's health may be performed before a second, subsequent application is fully installed on the system in order to eliminate additional variables. The method may also comprise identifying all data, files, and system changes associated with, or that result from installing, the application. The method may further comprise associating such files, data, and system changes with a single file, such as an executable file or installer, associated with the application.

As detailed above, additional embodiments may provide users with access to information that details, by application category, the potential impact an application may have on a user's computing device. For example, a user may be provided with access to a database that contains: 1) application-identification information that identifies at least one characteristic of an application (such as the name or version of the application), 2) system-health-impact information (such as a system-health-impact score) that identifies the potential impact of the application on the health of a computing system, and 3) category information that identifies at least one category associated with the application.

Access to the database may be provided in a variety of ways. For example, a user interface (such as a local application or a website) may be provided to facilitate user access to the database. In certain embodiments, this user interface may enable a user to search or sort information in the database by a number of criteria, such as system-health-impact score, category, or application-identification information.

The application-identification information contained in the database may represent a program name for the application, a checksum or hash calculated for a file associated with the application, file-size information for the application, application-version information for the application, information that details the source of origin of the application, information that details any software or hardware dependencies for the application, information that details all data, files, and system changes associated with (or that result from installing) the application, or any other potentially useful information. Similarly, the system-health-impact information (which may, as will be described in greater detail below, be obtained from a plurality of additional computing systems on which the application has been installed) may comprise the results of at least one system-health evaluation, patch-frequency information for the application, upgrade-frequency information for the application, or any other potentially useful information. Corresponding systems and computer-readable media are also disclosed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram illustrating the results of an exemplary evaluation of a computing system's health according to at least one embodiment.

Figure 1:
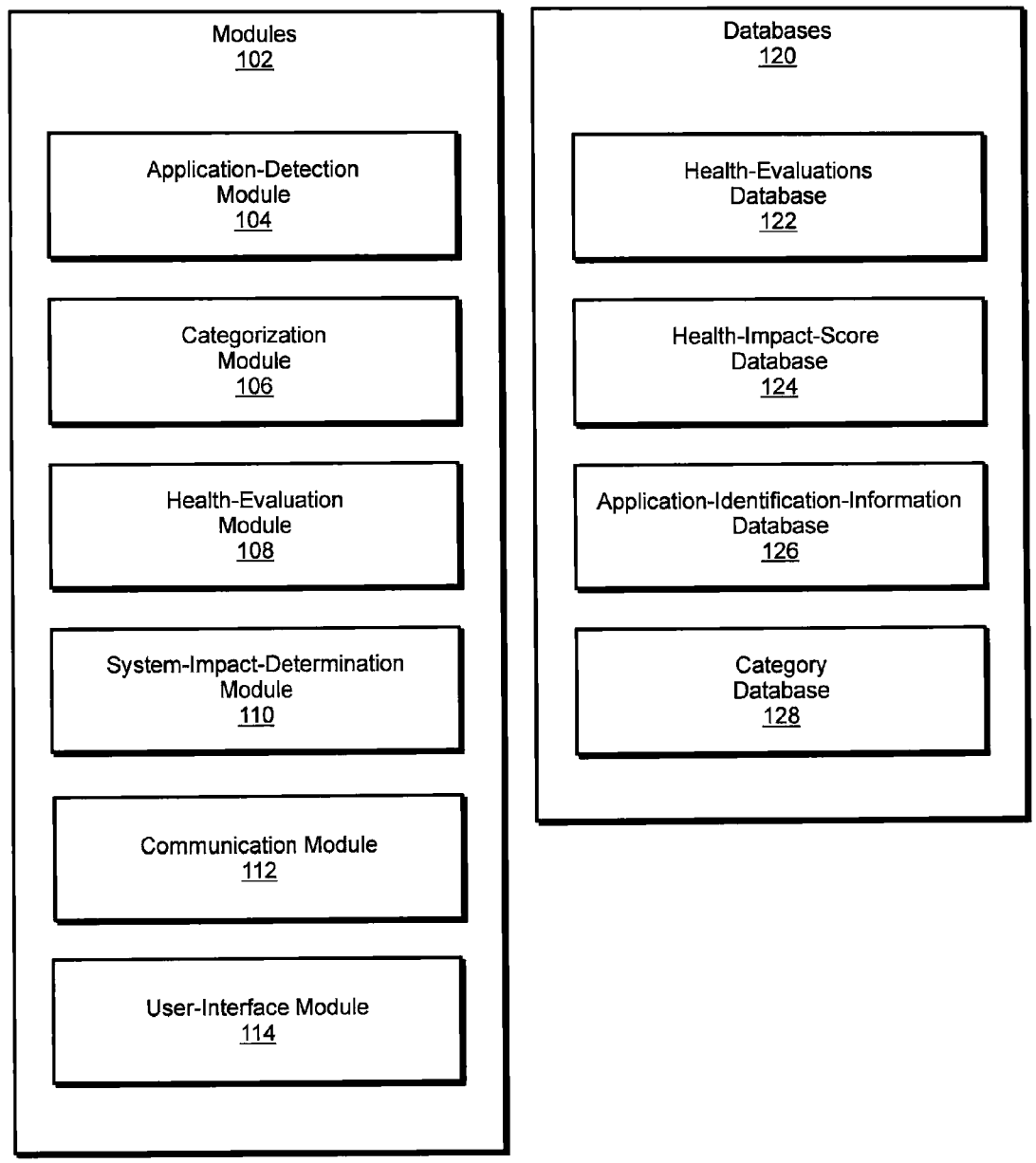
FIG. 1 is a block diagram of an exemplary system for providing guidance by category on the potential impact of an application on the health of a computing system according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for providing access to information that details, by application category, the potential impact an application may have on a user's computing device. Systems and methods for determining the impact of a new application on the health of a computing system by category are also disclosed. The term "health," as used herein, generally refers to the overall wellness of a computing system. As detailed below, in certain embodiments the health of a computing system may be determined by evaluating the performance, stability, and/or state of security of the computing system.

Figure 2:
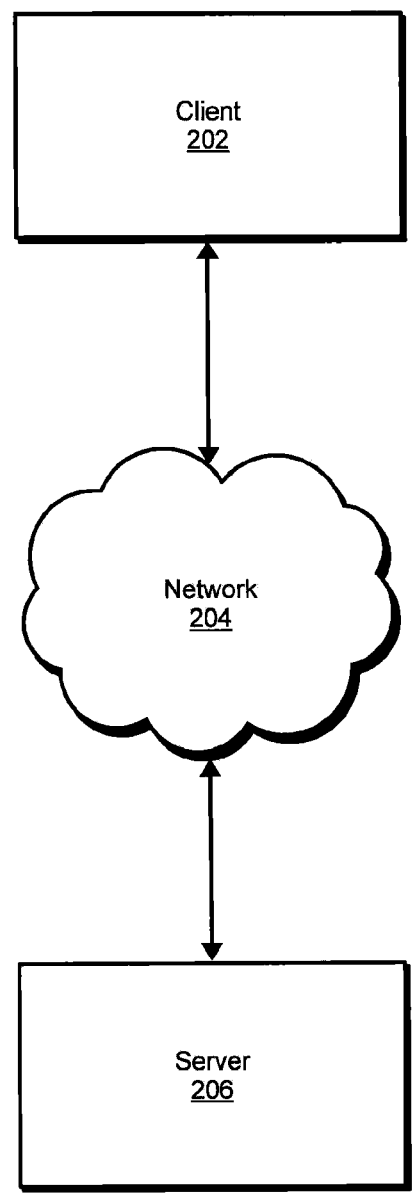
FIG. 2 is a block diagram of an exemplary network-based system for providing guidance by category on the potential impact of an application on the health of a computing system according to at least one embodiment.

The following will provide, with reference to FIGS. 1 and 2, detailed descriptions of exemplary systems for: 1) determining the impact of a new application on the health of a computing system by category and 2) providing access to information that identifies, by application category, the potential impact of an application on the health of a computing system. An illustration of the results of an exemplary evaluation of a computing system's health is provided in FIG. 4. Descriptions of exemplary user interfaces for providing access to information that identifies, by application category, the potential impact of an application on the health of a computing system are provided in connection with FIGS. 6 and 7. Detailed descriptions of corresponding exemplary computer-implemented methods will also be provided in connection with FIGS. 3 and 5.

FIG. 1 is a block diagram of an exemplary system for determining the impact of a new application on the health of a computing system by category and for providing access to information that identifies, by application category, the potential health impact of applications. As illustrated in this figure, exemplary system 100 may comprise one or more modules 102 for performing one or more tasks. For example, exemplary system 100 may comprise an application-detection module 104 for detecting applications downloaded, stored, loaded onto, or installed on a computing system and a categorization module 106 for categorizing such applications.

Exemplary system 100 may also comprise a health-evaluation module 108 for evaluating the health of a computing system (hereafter "system-health evaluations") and a system-impact-determination module 110 for determining, based on these system-health evaluations, the impact of an application on a system's health. In addition, exemplary system 100 may comprise a communication module 112 for facilitating communication between a computing system (such as a user's system) and a server or backend and a user-interface module 114 for providing a user interface.

As illustrated in FIG. 1, exemplary system 100 may also comprise one or more databases 120. For example, exemplary system 100 may comprise a health-evaluations database 122 for storing the results of system-health-evaluations performed by health-evaluation module 108. Exemplary system 100 may also comprise a health-impact-score database 124 for storing scores that represent the impact an application has on a computing system's health (hereafter, "health-impact scores"). As will be described in greater detail below, health-impact scores may be calculated based on information obtained from a plurality of computing systems.

As discussed in greater detail below, exemplary system 100 may also comprise an application-identification-information database 126 for storing information that may be used to identify applications and a category database 128 for storing category information for one or more applications. Although illustrated as separate devices, one or more of databases 120 may represent portions of a single database or a single computing device.

In certain embodiments, one or more of modules 102 may represent one or more software applications or programs that, when executed by a computing device, may cause the computing device to perform one or more tasks required to provide access to information that details, by application category, the potential impact an application may have on a user's computing device. For example, as will be described in greater detail below, one or more of modules 102 may represent software modules configured to run on one or more computing devices, such as client 202 in FIG. 2, server 206 in FIG. 2, computing system 810 in FIG. 8, and/or portions of exemplary network architecture 900 in FIG. 9. One or more of modules 102 may also represent all or portions of one or more special-purpose computers configured to perform one or more tasks required to determine whether a new application impacted the health of a computing system and/or to provide access to information that details, by application category, the potential impact an application may have on a user's computing device.

In addition, one or more of databases 120 may represent a portion of one or more computing devices. For example, one or more of databases 120 may represent a portion of client 202 in FIG. 2, server 206 in FIG. 2, exemplary computing system 810 in FIG. 8, and/or portions of exemplary network architecture 900 in FIG. 9. Alternatively, one or more of databases 120 may represent one or more physically separate devices capable of being accessed by a computing device, such as client 202 in FIG. 2, server 206 in FIG. 2, computing system 810 in FIG. 8, and/or portions of exemplary network architecture 900 in FIG. 9.

Exemplary system 100 in FIG. 1 may be deployed in a variety of ways. For example, all or a portion of exemplary system 100 may represent portions of a network-based system, such as exemplary network-based system 200 in FIG. 2. As illustrated in this figure, exemplary system 200 may comprise a client 202 in communication with a server 206 via a network 204.

Client 202 generally represents any type or form of client-side computing device capable of executing computer-readable instructions. In certain embodiments, client 202 may comprise one or more portions of exemplary system 100 in FIG. 1. For example, one or more of modules 102 in FIG. 1 may be stored and configured to run on client 202. Similarly, one or more of databases 120 in FIG. 1 may represent portions of client 202 in FIG. 2.

In at least one embodiment, client 202 may communicate with server 206 via network 204. Network 204 generally represents any type or form of communication or computing network; including, for example, an intranet, a wide area network (WAN), a local area network (LAN), a personal area network (PAN), or the Internet.

As illustrated in FIG. 2, exemplary system 200 may also comprise a server 206. Server 206 generally represents any type or form of server-side computing device, such as a back-end. In certain embodiments, server 206 may comprise one or more portions of exemplary system 100 in FIG. 1. For example, one or more of modules 102 from FIG. 1 may be stored and configured to run on server 206. Similarly, server 206 may comprise one or more of databases 120 in FIG. 1.

Figure 3:
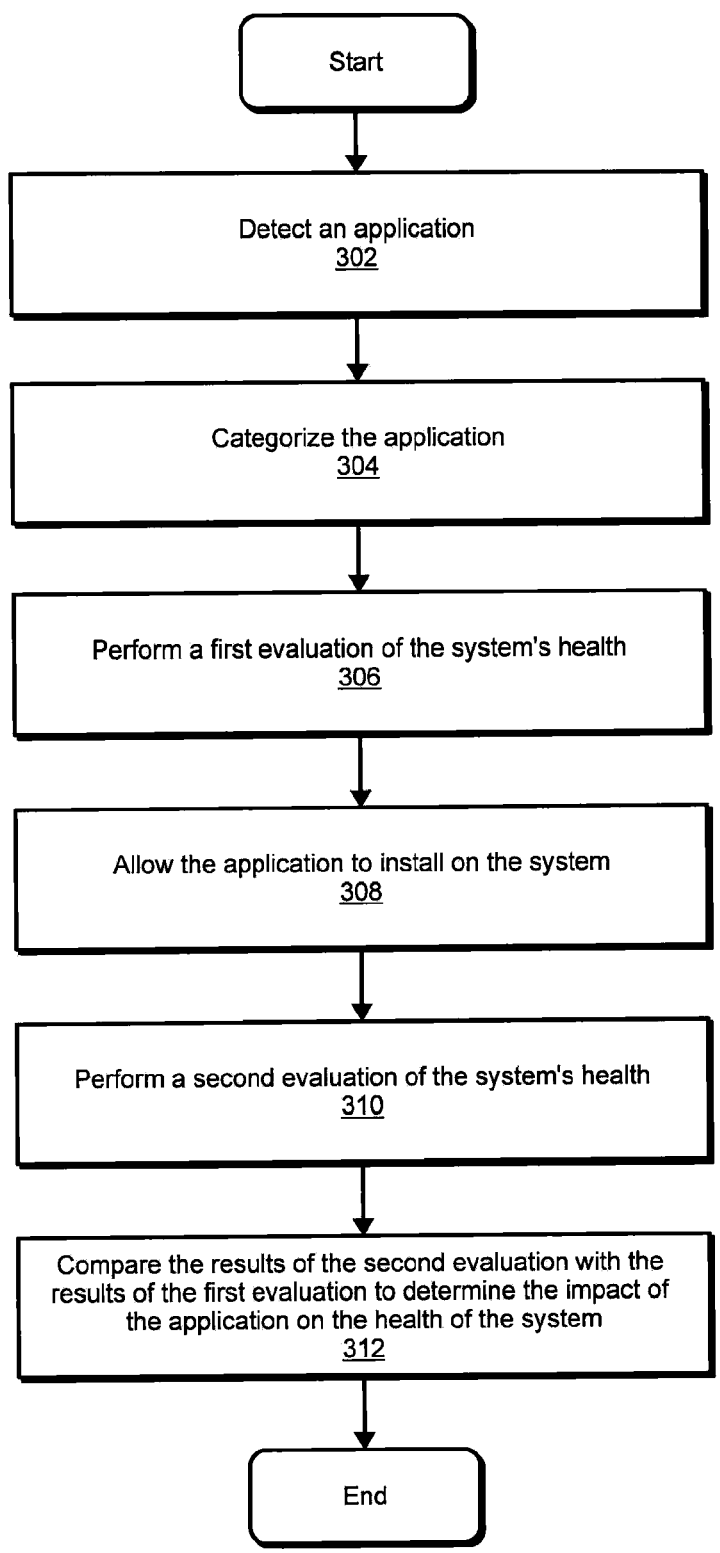
FIG. 3 is a flow diagram of an exemplary computer-implemented method for determining the impact of a new application on the health of a computing system by category according to at least one embodiment.

FIG. 3 is a flow diagram of an exemplary computer-implemented method 300 for determining the impact of a new application on the health of a computing system by category. As illustrated in this figure, at step 302 a new application may be detected. For example, application-detection module 104 in FIG. 1 may detect a new application downloaded onto, loaded onto, or stored on client 202 in FIG. 2. The phrase "application," as used herein, generally refers to any type or form of application software, including installation applications and installers. New applications may be detected in a variety of ways. For example, in certain embodiments application-detection module 104 in FIG. 1 may detect a new application by file type (e.g., MSI), by name (e.g., setup.exe or install.exe), or by determining the source of the file (e.g., internet browser, e-mail client, etc.).

Applications may be detected either prior to being installed on a system or shortly after being installed on a system. For example, application-detection module 104 may detect a new application that is downloaded to, stored on, or loaded onto client 202 before the application is fully installed on client 202. In alternative embodiments, application-detection module 104 may detect a new application shortly after the application is fully installed on client 202. In at least one embodiment, application-detection module 104 in FIG. 1 may also determine whether an application downloaded to, stored on, loaded onto, or installed on client 202 modified at least one setting of client 202.

In certain embodiments, detecting an application in step 302 may comprise identifying a unique identifier for the new application. The phrase "unique identifier," as used herein, generally refers to any type or form of identifier (such as a filename) for an application. Examples of unique identifiers include, without limitation, checksums, hashes, program names, and the like. Unique identifiers may be identified in a variety of ways. For example, application-detection module 104 in FIG. 1 may identify a unique identifier associated with an application downloaded to client 202 in FIG. 2 by identifying the name of the application, calculating a hash or checksum for an installer for the application, or the like.

In at least one embodiment, detecting an application in step 302 may also comprise identifying all data, files, and system changes associated with, or that result from installing, the application. For example, application-detection module 104 in FIG. 1 may detect: 1) all shared and non-shared program files created or modified by the new application, 2) all folders and directories created or modified by the new application, 3) any registry entries created or modified by the new application, 4) any configuration file entries created or modified by the new application, 5) any environment variables created or modified by the new application, and/or 6) any links or shortcuts created by the new application.

In addition, in certain embodiments all data, files, and system changes associated with or that result from installing an application may, after being identified, be associated with a single file, such as an executable file, associated with the application. For example, application-detection module 104 in FIG. 1 may, after identifying all data, files, and system changes associated with or that result from installing the application "MYPROG," associate each of these data, files, and system changes with the installation file "myprog_setup.exe" for the application "MYPROG." In certain embodiments, such an association may enable system 100 in FIG. 1 to accurately determine and track the impact of a single application on the health of a system, even if installation of the single application results in the creation of numerous files or system changes.

At step 304, the new application detected in step 302 may be categorized. Applications may be categorized in a variety of ways. In certain embodiments, categorizing the new application may comprise automatically assigning at least one application category, such as Multimedia or Word Processing, to the new application. For example, categorization module 106 in FIG. 1 may determine, using any number of heuristics, an appropriate category for the new application by analyzing one or more characteristics of the application, such as the application's name, functions performed by the application, metadata associated with the application, and/or the source of origin of the application. Categorization module 106 in FIG. 1 may also categorize an application by determining whether a category has been previously assigned to the application by a prior system, which may be evidenced by one or more entries in category database 128 in FIG. 1.

In an additional embodiment, an application may be categorized by prompting a user to assign at least one category to the new application. For example, categorization module 106 in FIG. 1 may display the name of the new application in a user interface provided by user-interface module 114 and then request that a user of the computing system assign at least one category to the application. In this embodiment, a user may select from one or more categories from a drop-down menu, create a new category to assign to the application, or the like.

At step 306, the current state of health of the computing system may be determined by performing a first system-health evaluation. As will be explained in greater detail below, this "first" system-health evaluation may be used as a reference or baseline health evaluation for later comparison with subsequent system-health evaluations to determine whether the new application detected in step 302 impacted the health of the computing system. The phrase "system-health evaluation," as used herein, generally refers to any type or form of evaluation used to determine the health of a computing system. Examples of system-health evaluations include, without limitation, performance evaluations (which may measure the performance of various aspects of a computing system, such as memory usage, CPU usage, and page faults) and stability evaluations (which may measure the stability of a computing system by determining, for example, the number of operating-system, application, and service errors experienced by the computing system).

Step 306 in FIG. 3 may be performed in a variety of ways. For example, health-evaluation module 108 in FIG. 1 may, after application-detection module 104 detects a new application in step 302, perform a first system-health evaluation of client 202 in FIG. 2. An illustration of the results of an exemplary first system-health evaluation 400 that may be performed by health-evaluation module 108 is provided in FIG. 4. As illustrated in this figure, first system-health evaluation 400 may comprise a first stability index 402 and a first performance index 412. In certain embodiments, first stability index 402 may comprise a plurality of stability metrics 404 and results 406 for each of these metrics. Stability metrics 404 generally represent any type or form of metric that may be used to measure the stability of a system. Examples of values that stability metrics may measure include, without limitation, operating-system errors (such as blue-screen errors), application errors (such as application hangs), service errors, device-driver errors, system uptime, and system reboots (such as the number of system reboots per day). In the example provided in FIG. 4, first stability index 402 details the average number of blue-screen errors identified by health-evaluation module 108 during the evaluation period (in this case, zero), the average number of service errors identified by health-evaluation module 108 (one), and the average number of application errors identified by health-evaluation module 108 (one). In some embodiments, one or more of these errors may be caused by a conflict between the application detected in step 302 and one or more applications previously installed on the system.

As with first stability index 402, first performance index 412 may comprise a plurality of performance metrics 414 and results 416 for each of these metrics. Performance metrics 414 generally represent any type or form of metric that may be used to measure the performance of a system. Examples of values that performance metrics 414 may measure include, without limitation, CPU usage, page faults, network usage (such as the number of IP datagrams), and memory usage. As illustrated in FIG. 4, the results 406 and 416 of stability metrics 404 and performance metrics 414 may be represented using running averages, maximum or peak values, incremental count values, or any other suitable method. In the example provided in FIG. 4, first performance index 412 details the computing system's maximum and average CPU usage during the evaluation period (in this case, 7 and 2.1875, respectively), the maximum and average number of page faults experienced by the system during the evaluation period (844 and 248.4375, respectively), and the maximum and average number of IP datagrams sent and received by the system during the evaluation period (8 and 3.25, respectively).

In certain embodiments, the first system-health evaluation detailed in step 306 may be performed before the new application detected in step 302 is fully installed on the computing system. In alternative embodiments, this first system-health evaluation may be performed immediately after the new application is fully installed on the system. In at least one embodiment, the results of the first system-health evaluation performed in step 306 may be stored in a database, such as health-evaluations database 122 in FIG. 1.

Returning to FIG. 3, at step 308 the application detected in step 302 may be installed on the system, such as client 202 in FIG. 2. The term "installation," as used herein, generally refers to the act of loading an application onto a computing system so that it can be executed. In certain embodiments, an application may be installed using a formal installer that may automatically perform various functions necessary to allow the application to be executed, such as unpacking files associated with the application, changing various system settings on the computing system, and the like. In alternative embodiments, an application may be installed simply by copying an application's files to a desired location on the computing system.

After the application is installed, at step 310 a second system-health evaluation may be performed. For example, health-evaluation module 108 in FIG. 1 may, after a new application is installed on client 202, perform a second system-health evaluation in order to determine whether the new application impacted the health of client 202. An illustration of the results of a second system-health evaluation 420 that may be performed by health-evaluation module 108 is provided in FIG. 4. As illustrated in this figure, second system-health evaluation 420 may comprise a second stability index 422 containing results 426 for a plurality of stability metrics 424 and a second performance index 432 containing results 436 for a plurality of performance metrics 434.

In the example provided in FIG. 4, second stability index 422 details the average number of blue-screen errors (zero), service errors (two), and application errors (three) identified by health-evaluation module 108 subsequent to installation of the new application in step 308. Similarly, second performance index 432 details the computing system's maximum and average CPU usage subsequent to installation of the new application (58 and 10.1999, respectively), the maximum and average number of page faults experienced by the system subsequent to installation of the new application (3423 and 960.85, respectively), and the maximum and average number of IP datagrams sent and received by the system subsequent to installation of the new application (9 and 3.25, respectively).

The second system-health evaluation detailed in step 310 may be performed either upon the expiration of a predetermined period of time or upon the occurrence of some specified event. For example, a second system-health evaluation may be performed one week after installation of the new application on the computing system. Alternatively, this second system-health evaluation may be performed after detecting, but before installing, a second new application (i.e., a new application that is different from the new application detected in step 302) to eliminate additional variables. This second system-health evaluation may also be performed after detecting, but immediately after installing, the second new application. In at least one embodiment, the results of the second system-health evaluation performed in step 308 may be stored in a database, such as health-evaluations database 122 in FIG. 1.

Returning to FIG. 3, at step 312 the results of the second system-health evaluation from step 310 may be compared with the results of the first system-health evaluation from step 304 to determine whether the application impacted the health of the system. Step 312 may be performed in a variety of ways. For example, in certain embodiments system-impact-determination module 110 in FIG. 1 may compare the results of a first system-health evaluation, such as first system-health evaluation 400 in FIG. 4, with the results of a second, subsequent system-health evaluation, such as second system-health evaluation 420 in FIG. 4, to determine whether an application installed on client 202 in FIG. 2 has negatively impacted the health (e.g., the stability or performance) of client 202. Upon completion of step 312 in FIG. 3, exemplary method 300 may terminate.

The impact of an application on the health of a computing system may be expressed or quantified in a variety of ways. In certain embodiments, one or more system-health-impact scores, such as system-health-impact scores 440 in FIG. 4, may be calculated based on first system-health evaluation 400 and second system-health evaluation 420. As illustrated in FIG. 4, system-health-impact scores 440 may represent the impact an application has on the stability (as represented by the results contained in stability-impact table 442) and performance (as represented by the results contained in performance-impact table 446) of a system. For example, the results in stability-impact table 442 may demonstrate whether there has been a percentage increase in blue-screen errors, service errors, and/or application errors subsequent to installation of the new application. Similarly, the results in performance-impact table 446 may demonstrate whether there has been a percentage increase in CPU usage, memory usage, page faults, and/or network usage subsequent to installation of the new application.

For example, the results contained in stability-impact table 442 in FIG. 4 demonstrate that there has been a 50% increase in the average number of service and application-related errors experienced by the system subsequent to installation of the new application. Similarly, the results contained in performance-impact table 446 demonstrate that there has been a significant increase in average CPU usage (78.5539%), maximum CPU usage (87.9130%), average number of page faults (74.1440%), maximum number of page faults (75.3433%), and maximum number of IP datagrams (11.1111%) subsequent to installation of the new application.

In at least one embodiment, an average stability-impact score may be calculated for the application by averaging the results contained in stability-impact table 442 (which, in the example illustrated in FIG. 4, results in an average stability-impact score of −33.3333%). Similarly, an average performance-impact score for the application may be calculated by averaging the results contained in performance-impact table 446 (which, in the example illustrated in FIG. 4, results in an average performance-impact score of −55.5109%). An overall system-health-impact score for the application may then be calculated by averaging the average-stability-impact score with the average-performance-impact score (which, in the example illustrated in FIG. 4, results in an overall system-health-impact score of −44.4421%). In at least one embodiment, one or more of system-health-impact scores 440 in FIG. 4 may be stored in a database, such as health-impact-score database 124.

As detailed above, the potential impact of an application on the health of a computing system may be expressed or quantified in a variety of ways. As such, while the system-health evaluations and results illustrated in FIG. 4 have been described with a certain degree of particularity, the potential impact of an application on the health of a computing system may be calculated using any number of additional heuristics, formulas, or methods.

In addition, one or more of steps 302-312 in FIG. 3 may be performed by a local system (such as client 202 in FIG. 2 and/or computing system 810 in FIG. 8), by a remote system (such as such as server 206 in FIG. 2 and/or portions of exemplary network architecture 900 in FIG. 9), or any combination thereof. For example, a local system, such as client 202 in FIG. 2 and/or computing system 810 in FIG. 8, may determine whether a new application impacted the health of a computing system in step 312 by comparing the results of the first system-health evaluation with the results of the second system-health evaluation. Alternatively, a remote computing device, such as server 206 in FIG. 2 and/or portions of exemplary network architecture 900 in FIG. 9, may determine whether a new application impacted the health of a computing system in step 312 by comparing the results of the first system-health evaluation with the results of the second system-health evaluation.

For example, the results of both system-health evaluations (i.e., first system-health evaluation in step 306 and second system-health evaluation in step 310) may be transmitted, along with a unique identifier for the application, to a server or a backend. For example, communication module 112 in FIG. 1 may cause client 202 in FIG. 2 to transmit the results of the first and second system-health evaluations, along with a checksum or hash calculated for the application's installer (which may be used, as detailed above, to identify the application), to server 206 in FIG. 2. In at least one embodiment, the results of these system-health evaluations may be stored in a database, such as health-evaluations database 122 in FIG. 1.

The server may then determine whether the application impacted the health of the system by comparing the results of the second system-health evaluation with the results of the first system-health evaluation. For example, system-impact-determination module 110 in FIG. 1 may cause server 206 in FIG. 2 to calculate one or more system-health-impact scores, such as system-health-impact scores 440 in FIG. 4, for the application by comparing the results from the first system-health evaluation from step 306 with the results of the second system-health evaluation from step 310. The server or backend may store the resulting system-health-impact score or scores in a database, such as health-impact-score database 124 in FIG. 1.

In certain embodiments, the system-impact-health score or scores for the application that are calculated by the local system or the remote system may also be normalized. The terms "normalize" and "normalization," as used herein, generally refer to a division of multiple sets of data by a common variable in order to negate that variable's effect on the data. As will be explained in greater detail below, in at least one embodiment this normalization process may allow system-impact-health scores obtained from a plurality of systems, each of which may have particular characteristics that vary from the characteristics of other systems (such as processor speeds, memory amounts, and the like), to be accurately compared. System-health-impact scores may be normalized using any feasible normalization method. For example, the average CPU-usage-impact score for an application (such as the average CPU-usage-impact score contained in performance-impact table 446 in FIG. 4) may be normalized by dividing the average CPU impact score by the processor speed of the system, resulting in a per-MHz CPU-usage-impact score.

In at least one embodiment, normalizing the system-health-impact score or scores may also comprise determining whether the system called or executed the installed application before the second-system evaluation in step 310 was performed. In at least one embodiment, a higher confidence level may be assigned to system-health-impact scores calculated for an application if the application was called or executed by the system during the evaluation period, since such a situation may provide a more accurate representation of the impact of the application on the health of the system. Similarly, a lower confidence level may be assigned to system-health-impact scores calculated for an application if the application was not called or executed by the system during the evaluation period. Again, as with the previous normalization example described above, this process may allow system-impact-health scores obtained from a plurality of systems to be accurately compared.

Figure 5:
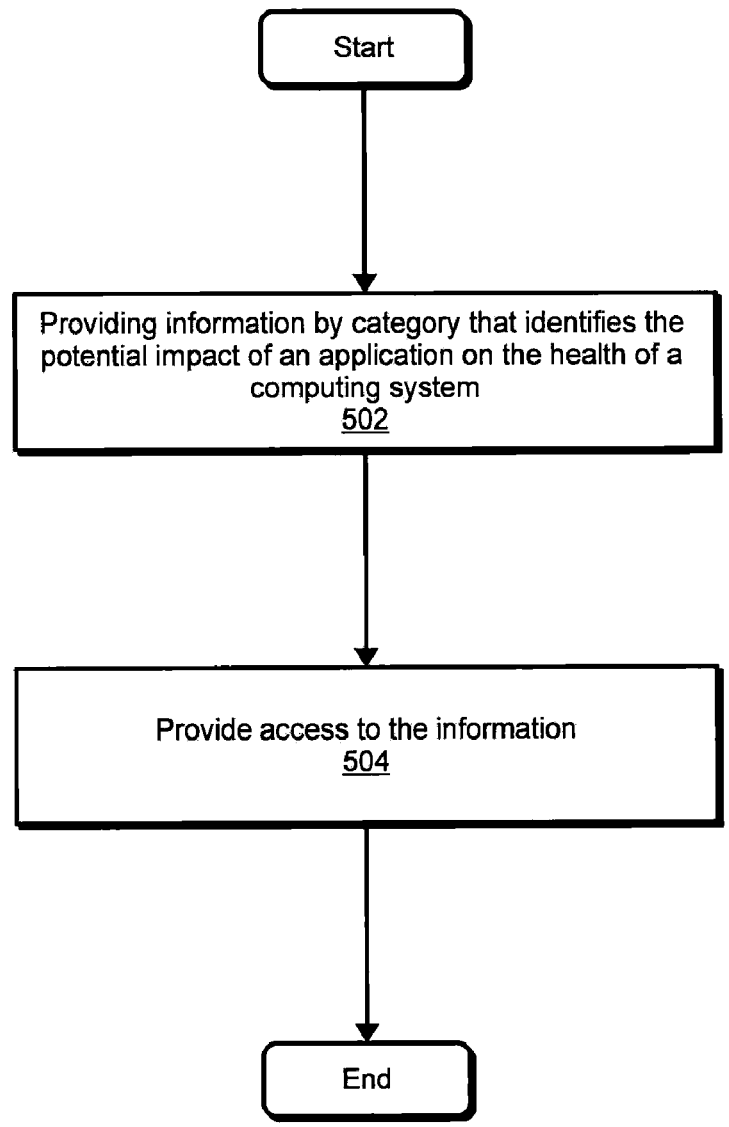
FIG. 5 is a flow diagram of an exemplary computer-implemented method for providing system-health-impact information for applications by category according to at least one embodiment.

As detailed above, embodiments of the instant disclosure may provide users with access to information that details, by application category, the potential impact an application may have on a user's computing device. FIG. 5 is a flow diagram of an exemplary computer-implemented method 500 for providing access to such information according to at least one embodiment. As illustrated in this figure, at step 502 information that identifies the potential impact of an application on the health of a computing system may be provided by category (i.e., "system-health-impact information").

As detailed above, the phrase "system-health-impact information" may refer to any type or form of information that may be used to determine the potential impact of an application on the health of a system. Examples of system-health-impact information include, without limitation, a system-health-impact score for the application (which, as detailed above, may be based on system-health-impact information obtained from a plurality of computing systems on which the application has been installed), the results of at least one system-health evaluation obtained from at least one computing system (such as the system-health evaluations illustrated in FIG. 4), or any other potential useful information.

In certain embodiments, the information provided in step 502 may also comprise application-identification information for at least one application. The phrase "application-identification information" generally refers to any type or form of information associated with, or that may be used to identify, an application. Examples of application-identification information include, without limitation, unique identifiers for an application (such as a program named for an application or a checksum calculated for a file associated with an application), file-size information for an application, application-version information for an application, application-origination information for an application (which may identify, for example, the source of origin of an application), application-dependency information for the application (which may identify, for example, any software or hardware dependencies for the application), application-installation information for the application, or any other potentially useful information. The phrase "application-installation information" may refer to information that identifies all data, files, and system changes associated with an application or that result from installing an application, as detailed above.

In certain embodiments, the information provided in step 502 may also comprise category information for one or more applications. The phrase "category information" generally refers to information that identifies one or more application categories associated with an application.

Figure 8:
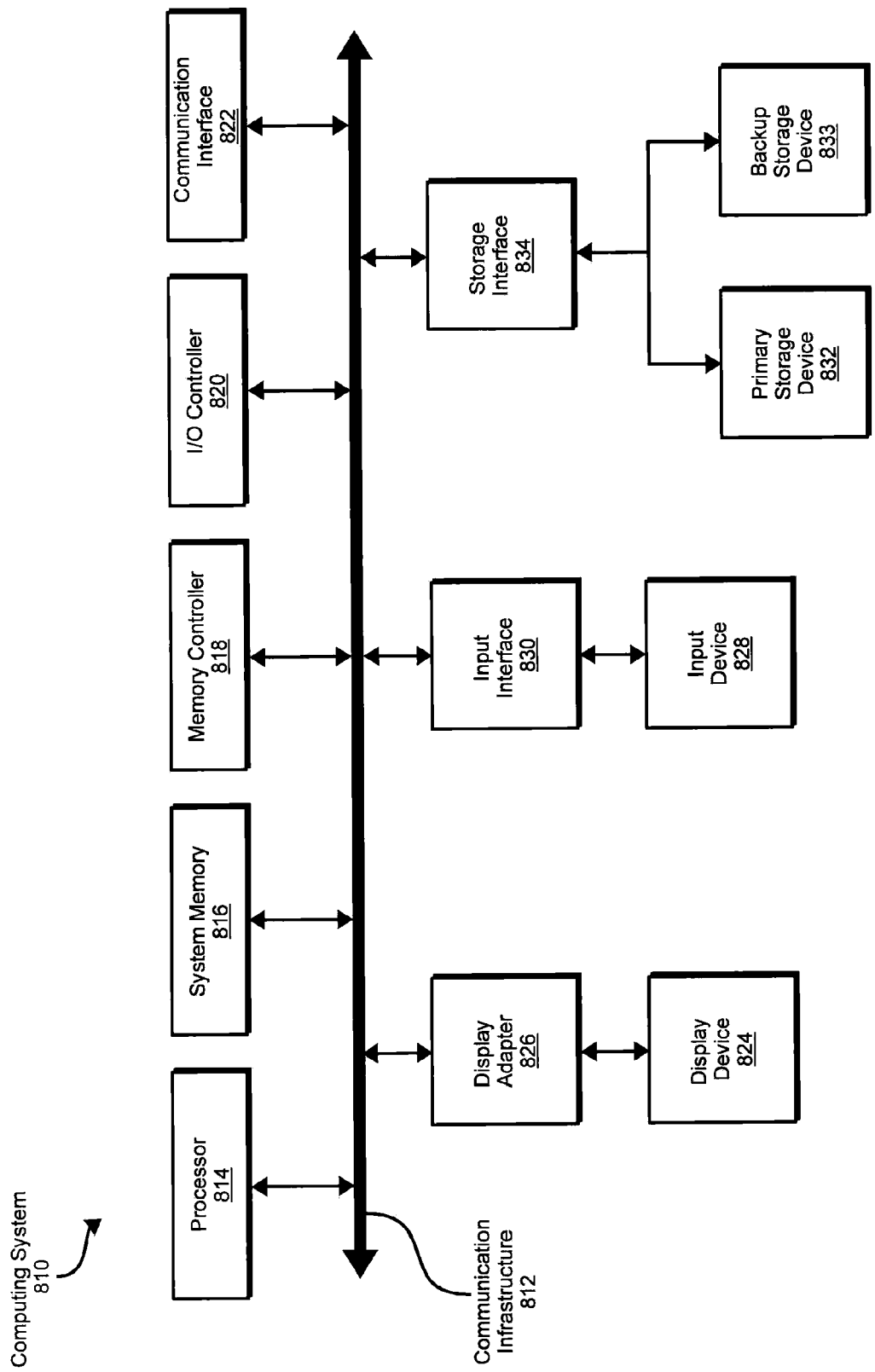
FIG. 8 is a block diagram of an exemplary computing system capable of implementing one or more of the embodiments described and/or illustrated herein.

In at least one embodiment, the system-health-impact information provided in step 502 may be based on information obtained from a plurality of systems, such as client 202 in FIG. 2 and/or computing system 810 in FIG. 8, on which the application has been installed. In certain embodiments, the information obtained from this plurality of systems may comprise, for example, the results of at least one system-health evaluation, patch-frequency information for an application (which may detail, for example, the number of patches applied to an application during an evaluation period), upgrade-frequency information for the application (which may detail, for example, the number of upgrades applied to an application during an evaluation period), frequency-of-use information for an application (which may detail, for example, how often an application was used by a computing system during an evaluation period), length-of-use information for an application (which may detail, for example, the length of time an application has been installed and in use on a computing system), or any other potential useful information.

Step 502 may be performed in a variety of ways. In at least one embodiment, providing information that identifies the potential impact of an application on the health of a computing system by category may comprise providing a database (such as database 120 in FIG. 1) containing system-health-impact information for applications by category. In this example, database 120 in FIG. 1 may comprise a health-evaluations database 122 containing the results of one or more system-health evaluations for one or more applications obtained from one or more computing systems on which the application has been installed. Database 120 may also comprise a health-impact score database 124 containing system-health-impact scores for one or more applications, which, as detailed above, may be received from local computing devices or calculated by a remote computing device based on system-impact information obtained from local computing devices.

At step 504, access to the information identified in step 502 may be provided. Step 504 may be performed in a variety of ways. In certain embodiments, providing access to the information detailed in step 502 may comprise providing access to a database, such as database 120 in FIG. 1. For example, a website may be provided that facilitates user access to database 120 in FIG. 1. As will be described in greater detail below, in certain embodiments this website may allow a user to search for information on applications within database 120 by one or more criteria, such as system-health-impact score, category, or application-identification information.

Figure 6:
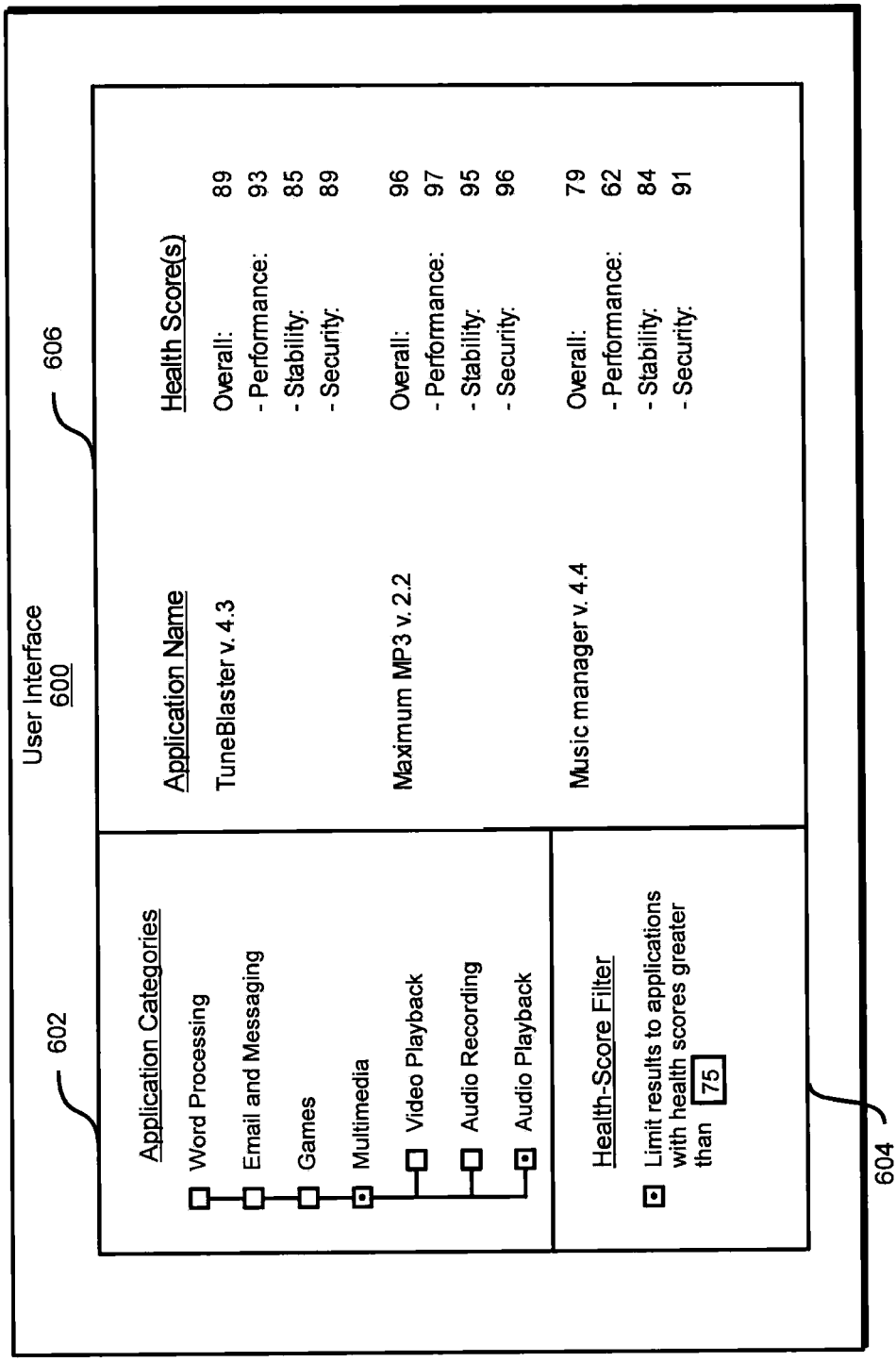
FIG. 6 is a block diagram of an exemplary user interface for providing access to information that identifies, by application category, the potential impact of an application on the health of a computing system according to at least one embodiment.

FIG. 6 is a block diagram of an exemplary user interface 600 for providing access to a database, such as database 120 in FIG. 1, containing system-health-impact information for applications by category. User interface 600 generally represents any type or form of user interface. Examples of user interface 600 include, without limitation, a website, a user interface generated by a module (such as user interface module 114 in FIG. 1) stored on a local computing device (such as client 202 in FIG. 2), or any other suitable user interface. In the example illustrated in FIG. 6, user interface 600 may comprise a first display area 602, a second display area 604, and a third display area 606.

In at least one embodiment, first display area 602 may display one or more user-selectable or searchable application categories. Examples of application categories that may be displayed in first display area 602 include, without limitation, Word Processing, Email and Messaging, Games, Multimedia, Document Management, or any other application category. First display area 602 may also display one or more subcategories for each application category. For example, as illustrated in FIG. 6, the application category "Multimedia" may comprise the subcategories "Video Playback," "Audio Recording," and "Audio Playback."

In at least on embodiment, a user may request system-health-impact information for one or more applications by category by selecting one or more of the categories or subcategories displayed in first display area 602. For example, a user may request system-health-impact information for applications classified under the subcategory "Audio Playback" by selecting the application category "Multimedia" and then selecting the subcategory "Audio Playback." Application-identification information and/or system-health-impact information for each application classified within the subcategory "Audio Playback" may then be displayed in third display area 606. For example, application-identification information for each application classified within the subcategory "Audio Playback," such as the name and version of each application (in this case TuneBlaster v. 4.3, MaximumMP3 v. 2.2, and MusicManager v. 1.4), may be displayed in third display area 606. One or more system-health-impact scores for each application classified within the subcategory "Audio Playback" may also be displayed in third display area 606. For example, a performance-impact score, a stability-impact score, a security-impact score, and/or an overall system-health-impact score for each application classified within the subcategory "Audio Playback" may be displayed in third display area 606.

In certain embodiments, user interface 600 may enable a user to locate and identify applications by 1) category, 2) application-identification information (such as by application name and/or version), and/or 3) system-health-impact information (such as by system-health-impact score). In at least one embodiment, user interface 600 may also enable a user to sort any of the information displayed in first display area 602 and/or third display area 606. For example, a user may, by interacting with user interface 600, cause each application listed within third display area 606 to be displayed in alphabetical order. Similarly, a user may, by interacting with user interface 600, cause each application displayed within third display area 606 to be sorted by system-health-impact score, either in ascending or descending order. For example, a user may cause user interface 600 to display each application classified within the subcategory "Audio Playback" to be displayed in third display area 606 by system-health-impact scores in descending order, i.e., from the highest system-health-impact score to the lowest system-health-impact score.

User interface 600 may also comprise a second display area 604 for displaying a health-score filter. In certain embodiments, a user may limit the results displayed within third display area 606 by entering a filter criteria in second display area 604. For example, a user may request that only applications having system-health-impact scores exceeding a certain number (such as 75) be displayed within third display area 606. As such, the health-score filter contained within second display area 604 may allow a user to further customize and sort the results displayed within third display area 606.

Figure 7:
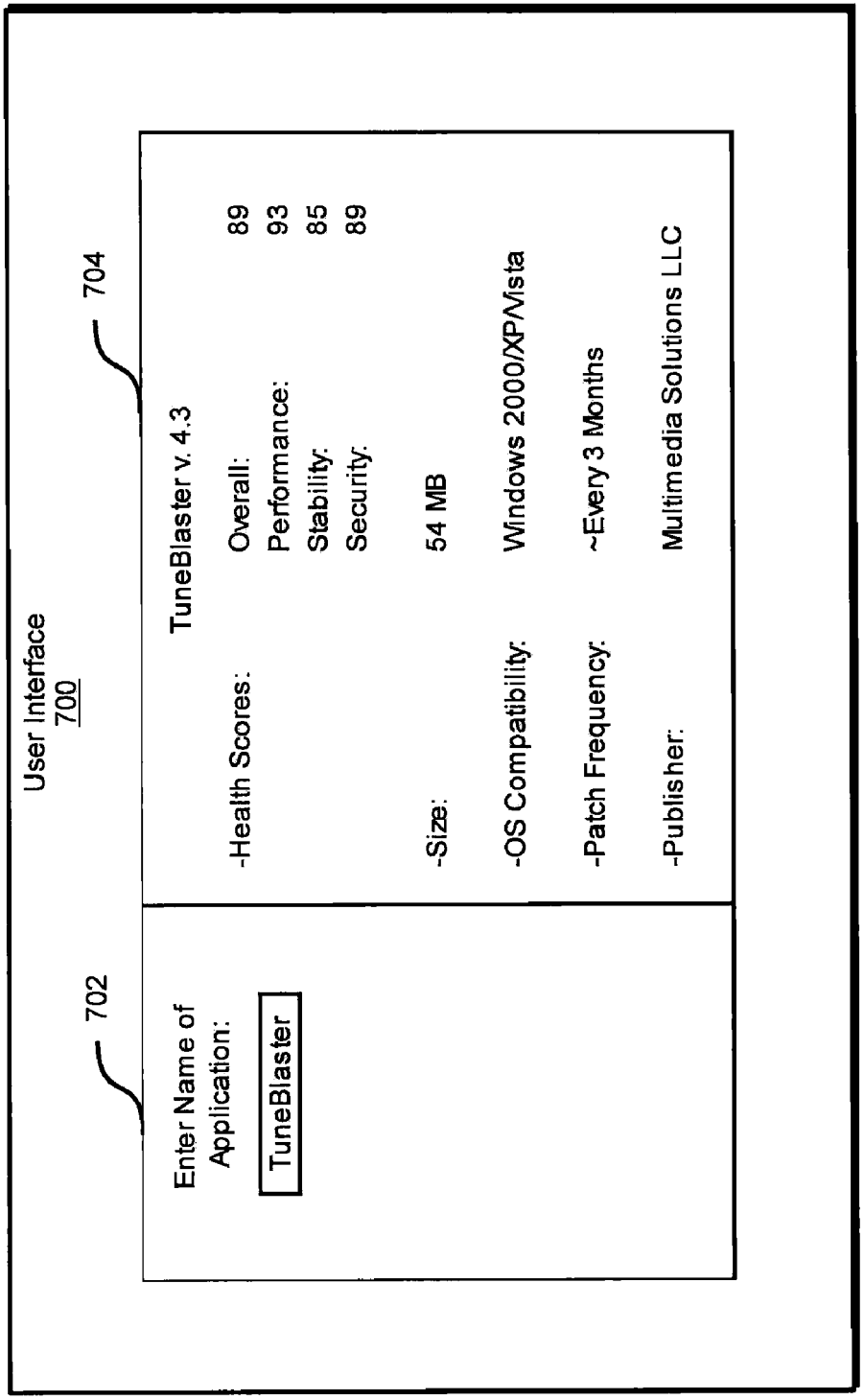
FIG. 7 is a block diagram of an exemplary user interface for providing access to information that identifies, by application category, the potential impact of an application on the health of a computing system according to an additional embodiment.

As detailed above, any type or form of user interface may be used to provide access to a database (such as database 120 in FIG. 1) containing system-health-impact information for applications by category. FIG. 7 is a block diagram of an exemplary user interface for providing access to such a database according to an additional embodiment. As illustrated in this figure, user interface 700 may comprise a first display area 702 and a second display area 704.

In certain embodiments, a user may enter application-identification information for an application (such as the name and/or version of an application) into first display area 702. Upon entering this information, system-health-impact information for this application may be displayed within second display area 704. For example, second display area 704 may display the name of the application, the file size of the application, the operating systems on which the application may run, how often the application has been patched, how often the application has been upgraded, the publisher of the application, or any other potentially useful or relevant information.

As detailed above, the exemplary user interfaces illustrated in FIG. 6 and FIG. 7 may provide users with access to a database containing system-health-impact information for applications by category. In many cases, the system-health-impact information contained within this database may enable users to identify applications within a specific category that will have the least amount of detrimental impact on the health of the user's computing device. The system-health-impact information contained within this database may also enable users to identify other characteristics (such as patch frequency, upgrade frequency, or the like) that may influence a user's decision on whether to download and install a specific application.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the detecting, categorizing, performing, allowing, determining, comparing, calculating, identifying, transmitting, assigning, prompting, creating, and providing steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller may perform and/or be a means for performing, either alone or in combination with other elements, one or more of the steps or features described and/or illustrated herein, such as detecting, categorizing, performing, allowing, determining, comparing, calculating, identifying, transmitting, assigning, prompting, creating, and providing.

I/O controller 820 generally represents any type or form of module capable of coordinating and/or controlling the input and output functions of a computing device. For example, in certain embodiments I/O controller may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the detecting, categorizing, performing, allowing, determining, comparing, calculating, identifying, transmitting, assigning, prompting, creating, and providing steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the detecting, categorizing, performing, allowing, determining, comparing, calculating, identifying, transmitting, assigning, prompting, creating, and providing steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the detecting, categorizing, performing, allowing, determining, comparing, calculating, identifying, transmitting, assigning, prompting, creating, and providing steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, the exemplary file systems disclosed herein may be stored on primary storage device 832, while the exemplary file-system backups disclosed herein may be stored on backup storage device 833. Storage devices 832 and 833 may also be used, for example, to perform and/or be a means for performing, either alone or in combination with other elements, one or more of the detecting, categorizing, performing, allowing, determining, comparing, calculating, identifying, transmitting, assigning, prompting, creating, and providing steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments descried and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
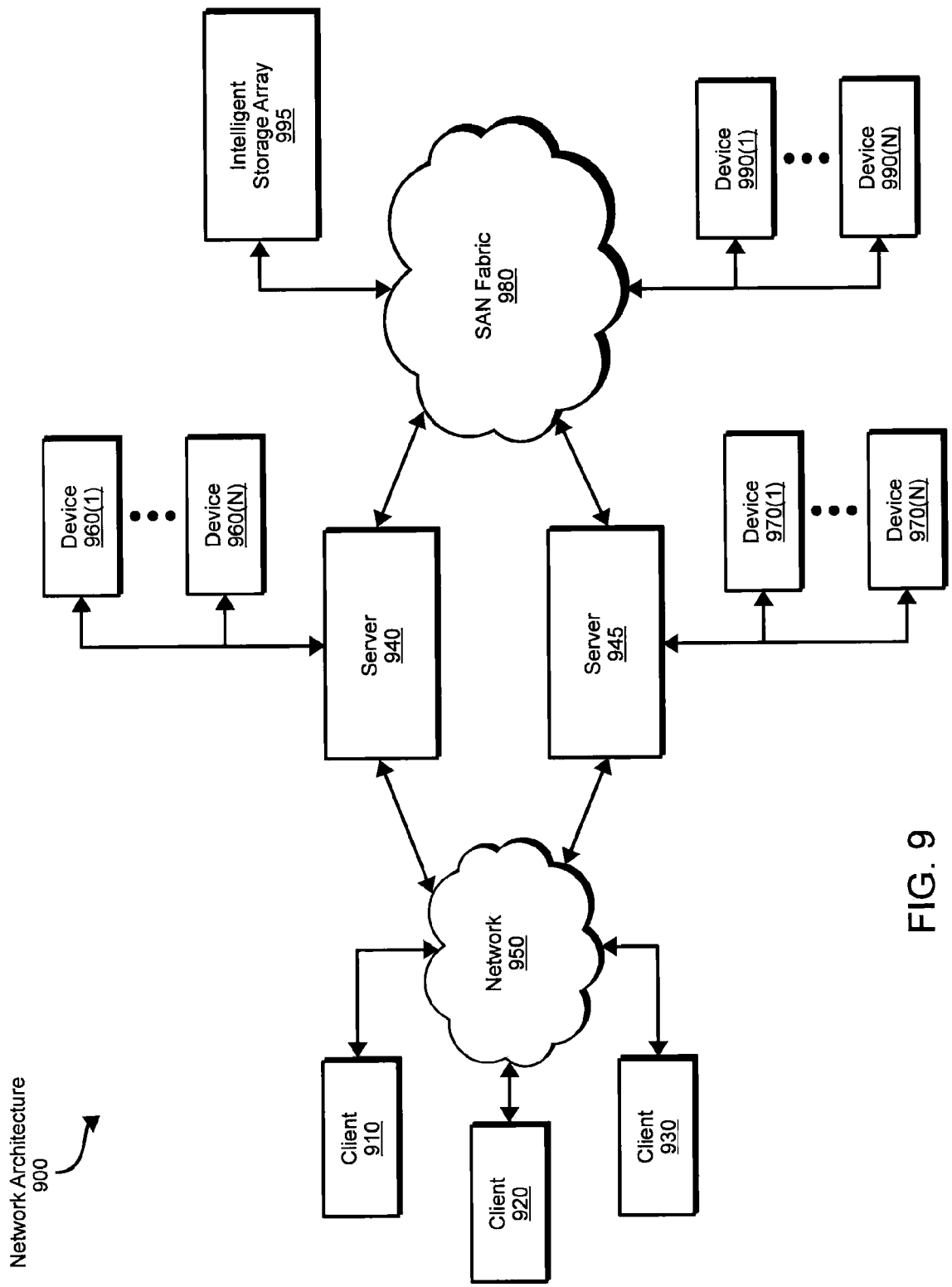
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or to run certain software applications. Network 950 generally represents any telecommunication or computer network; including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 990(1)-(N) generally represent any type or form of storage device or medium capable of storing data and/or other computer-readable instructions. In certain embodiments, storage devices 960(1)-(N) and storage devices 990(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the detecting, categorizing, performing, allowing, determining, comparing, calculating, identifying, transmitting, assigning, prompting, creating, and providing steps disclosed herein. Network architecture 900 may also be used to perform and/or be a means for performing other steps and features set forth in the instant disclosure.

As detailed above, computing system 810 and/or one or more of the components of network architecture 900 may perform and/or be a means for performing, either alone or in combination with other elements, one or more steps of the exemplary methods described and/or illustrated herein. For example, a computer-implemented method for determining the impact of a new application on the health of a computing system may comprise detecting the new application, categorizing the new application, performing a first evaluation of the system's health, allowing the new application to install on the system, performing a second evaluation of the system's health, and determining the impact of the new application on the health of the system by comparing the results of the second evaluation with the results of the first evaluation.

In certain embodiments, determining the impact of the new application on the health of the system may comprise calculating a system-health-impact score for the new application by comparing the results of the second evaluation with the results of the first evaluation, identifying a unique identifier associated with the new application, and transmitting the unique identifier and the system-health-impact score to a server. In an alternative embodiment, the method may further comprise identifying a unique identifier associated with a new application, and transmitting the results of both the first system-health evaluation and the second system-health evaluation, along with the unique identifier to a server, which may then determine the impact of the new application on the health of the system by comparing the results of the second system-health evaluation with the results of the first system-health evaluation.

In at least one embodiment, characterizing the new application may comprise prompting a user to assign at least one category to the new application. In an additional embodiment, characterizing the new application may comprise automatically assigning at least one category to the new application.

In certain embodiments, performing the first evaluation of the health of a system may comprise creating a first performance index based on at least one performance metric and/or a first stability index based on at least one stability metric. Similarly, performing the second evaluation of the health of a system may comprise creating a second performance index based on at least one performance metric and/or a second stability index based on at least one stability metric. In addition, comparing the second evaluation with the first evaluation may comprise comparing the second performance index with the first performance index and/or comparing the second stability index with the first stability index.

The performance metric may comprise processor usage, memory usage, network usage, page faults, or any other potentially useful metric. Similarly, the stability metric may comprise operating-system errors, application errors, service errors, device-driver errors, system uptime, system reboots, or any other potentially useful metric.

In certain embodiments, the application may be detected before the application is fully installed on the system. In addition, the first evaluation of the system's health may be performed before the application is fully installed on the system. The method may also comprise detecting a second application and performing the second evaluation of the system's health before the second application is fully installed on the system. In at least one embodiment, detecting the application may comprise identifying all data, files, and system changes associated with, or that result from installing, the application.

A computer-implemented method for providing access to a database containing system-health-impact information for a plurality of categorized applications may comprise providing a database that contains application-identification information for at least one application, system-health-impact information for the application obtained from a plurality of systems, and at least one category associated with the application and then providing access to the database to at least one computing device.

The application-identification information may comprise a program name for the application, a checksum calculated for a file associated with the application, file-size information for the application, application-version information for the application, application-origination information for the application, application-dependency information for the application, application-installation information for the application, or any other potentially useful information. In addition, the application-installation information may identify all data, files and system changes associated with, or that result from installing, the application.

In certain embodiments, the system-health-impact information may comprise the results of at least one system-health evaluation obtained from at least one system and/or a system-health-impact score for the application. In addition, the information obtained from the at least one system may comprise the results of at least one system-health evaluation, patch-frequency information for the application, upgrade-frequency for the application, frequency-of-use information for the application, length-of-use information for the application, or any other potentially useful information.

In certain embodiments, providing access to the database may comprise enabling searching or sorting of the database by one or more criteria, such as system-health-impact score, category, or application-identification information. Access to the database may also be provided by a website that facilitates user access to the database or by receiving and responding to database queries from clients.

In an additional embodiment, all or portions of exemplary system 100 in FIG. 1 may represent a system for providing access to system-health-impact information for a plurality of applications by category. In this example, the system may comprise a database that contains application-identification information for at least one application, system-health-impact information for the application that is obtained from a plurality of systems, and at least on category associated with the application. The system may also comprise a communication module for providing access to the database to at least one computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining the impact of a new application on the health of a computing system by category, at least a portion of the method being performed by at least one processor of the computing system, the method comprising:
    detecting the new application;
    categorizing the new application;
    performing a first evaluation of the computing system's health;
    allowing the new application to install on the computing system;
    after allowing the new application to install on the computing system, performing a second evaluation of the computing system's health;
    determining the impact of the new application on the health of the computing system by calculating a system-health-impact score for the new application by comparing the results of the second evaluation with the results of the first evaluation;
    identifying a unique identifier for the new application;
    transmitting the unique identifier and the system-health-impact score to a server.

2. A computer-implemented method for determining the impact of a new application on the health of a computing system by category, at least a portion of the method being performed by at least one processor of the computing system, the method comprising:
    detecting the new application;
    categorizing the new application;
    performing a first evaluation of the computing system's health;
    allowing the new application to install on the computing system;
    after allowing the new application to install on the computing system, performing a second evaluation of the computing system's health;
    identifying a unique identifier for the new application;
    transmitting the results of both the first evaluation and the second evaluation, along with the unique identifier, to a server to enable the server to determine the impact of the new application on the health of the computing system by comparing the results of the second evaluation with the results of the first evaluation.

3. The method of claim 1, wherein categorizing the new application comprises at least one of:
    automatically assigning at least one category to the new application;
    prompting a user to assign at least one category to the new application.

4. The method of claim 1, wherein:
    performing the first evaluation comprises creating at least one of:
        a first performance index based on at least one performance metric;
        a first stability index based on at least one stability metric;
    performing the second evaluation comprises creating at least one of:
        a second performance index based on at least one performance metric;
        a second stability index based on at least one stability metric;
    comparing the second evaluation with the first evaluation comprises at least one of:
        comparing the second performance index with the first performance index;
        comparing the second stability index with the first stability index.

5. The method of claim 4, wherein:
    the performance metric measures at least one of:
        processor usage;
        memory usage;
        network usage;
        page faults;
    the stability metric measures at least one of:
        operating-system errors;
        application errors;
        service errors;
        device-driver errors;
        system uptime;
        system reboots.

6. The method of claim 1, wherein the new application is detected before the new application is fully installed on the computing system.

7. The method of claim 1, wherein the first evaluation is performed before the new application is fully installed on the computing system.

8. The method of claim 1, wherein detecting the new application comprises identifying all data, files, and system changes associated with, or that result from installing, the new application.

9. The method of claim 1, further comprising:
    detecting a second new application;
    performing the second evaluation before the second new application is fully installed on the computing system.

10. A computer-implemented method for providing access to information by category that identifies the potential impact of an application on the health of a computing system, at least a portion of the method being performed by a server-side computing system comprising at least one processor, the method comprising:
> using the processor to provide health-impact information for at least one application, the health-impact information comprising:
> > application-identification information for the application that identifies at least one characteristic of the application;
> > system-health-impact information for the application that identifies the potential impact of the application on the health of a computing system, the system-health-impact information based on information obtained from at least one client-side computing system, the information obtained from the client-side computing system comprising:
> > > a unique identifier associated with the application;
> > > the results of at least one system-health evaluation performed in connection with the application;
> > > category information for the application that identifies at least one category associated with the application;
> > using the processor to provide access to the health-impact information.

11. The method of claim 10, wherein:
providing the health-impact information comprises providing a database containing the health-impact information;
providing access to the health-impact information comprises providing access to the database to at least one additional computing system.

12. The method of claim 10, wherein the application-identification information comprises at least one of:
a program name for the application;
a checksum calculated for a file associated with the application;
file-size information for the application;
application-version information for the application;
application-origination information for the application;
application-dependency information for the application;
application-installation information for the application.

13. The method of claim 12, wherein the application-installation information identifies all data, files, and system changes associated with, or that result from installing, the application.

14. The method of claim 10, wherein the system-health-impact information comprises at least one of:
the results of the at least one system-health evaluation obtained from the client-side computing system;
a system-health-impact score for the application.

15. The method of claim 10, wherein the information obtained from the client-side computing system also comprises at least one of:
patch-frequency information for the application;
upgrade-frequency information for the application;
frequency-of-use information for the application;
length-of-use information for the application.

16. The method of claim 11, wherein providing access to the database comprises enabling searching of the database by at least one of:
system-health-impact information;
category information;
application-identification information.

17. The method of claim 11, wherein providing access to the database comprises providing a website that facilitates user access to the database.

18. The method of claim 11, wherein providing access to the database comprises:
receiving a database query from the additional computing system;
in response to the database query, transmitting a response to the additional computing system.

19. A system for providing access to information by category that identifies the potential impact of an application on the health of a computing system, the system comprising:
a database, the database comprising:
> application-identification information for the application that identifies at least one characteristic of the application;
> system-health-impact information for the application that identifies the potential impact of the application on the health of a computing system, the system-health-impact information based on information obtained from at least one client-side computing system, the information obtained from the client-side computing system comprising:
> > a unique identifier associated with the application;
> > the results of at least one system-health evaluation performed in connection with the application;
> > category information for the application that identifies at least one category associated with the application;

a communication module for providing access to the database to at least one additional computing system;
at least one processor configured to execute the communication module.

* * * * *